(12) United States Patent
Bohmer et al.

US010876252B2

(10) Patent No.: US 10,876,252 B2
(45) Date of Patent: Dec. 29, 2020

(54) PROCESS FOR DYEING AND FOAMING THERMOPLASTIC POLYURETHANE

(71) Applicant: Huntsman International LLC, The Woodlands, TX (US)

(72) Inventors: Lars Bohmer, Munster (DE); Ian Burnell, Bottmingen (CH); Rene Alexander Klein, Hoegaarden (BE); Jan Vandenbroeck, Scherpenheuvel-Zichem (BE); Anja Weismann, Ladbergen (DE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 0 days.

(21) Appl. No.: 16/461,181

(22) PCT Filed: Nov. 14, 2017

(86) PCT No.: PCT/EP2017/079157
§ 371 (c)(1),
(2) Date: May 15, 2019

(87) PCT Pub. No.: WO2018/091446
PCT Pub. Date: May 24, 2018

(65) Prior Publication Data
US 2020/0063338 A1 Feb. 27, 2020

(30) Foreign Application Priority Data

Nov. 16, 2016 (EP) ..................................... 16199031

(51) Int. Cl.
*D06P 3/00* (2006.01)
*D06P 3/26* (2006.01)
*D06L 4/643* (2017.01)
*C08J 9/12* (2006.01)
*C08J 9/18* (2006.01)
*D06P 1/00* (2006.01)
*D06P 1/16* (2006.01)
*D06P 1/44* (2006.01)
*D06P 1/92* (2006.01)
*D06P 1/94* (2006.01)

(52) U.S. Cl.
CPC .................. *D06P 3/26* (2013.01); *C08J 9/122* (2013.01); *C08J 9/18* (2013.01); *D06L 4/643* (2017.01); *D06P 1/0016* (2013.01); *D06P 1/0032* (2013.01); *D06P 1/16* (2013.01); *D06P 1/44* (2013.01); *D06P 1/928* (2013.01); *D06P 1/94* (2013.01); *C08J 2203/06* (2013.01); *C08J 2203/08* (2013.01); *C08J 2300/22* (2013.01); *C08J 2300/26* (2013.01); *C08J 2375/04* (2013.01)

(58) Field of Classification Search
CPC . C08J 9/18; C08J 2203/06; C08J 9/122; C08J 2203/14; C08J 9/141; C08J 9/228; C08J 2325/06; C08J 9/20; C08J 2300/22; C08J 2375/04; C08J 2203/08; C08J 9/22; B01J 3/04; B29C 44/3453; B29C 44/348; B29K 2075/00; B29L 2031/50
USPC .......................................................... 264/77
See application file for complete search history.

(56) References Cited

U.S. PATENT DOCUMENTS

| 5,269,815 A | 12/1993 | Schlenker et al. |
| 5,508,060 A | 4/1996 | Perman et al. |
| 5,670,102 A * | 9/1997 | Perman ............... B29C 44/3453 264/50 |
| 2014/0259329 A1* | 9/2014 | Watkins ............. B29D 35/0054 2/455 |
| 2016/0244912 A1 | 8/2016 | Kelly |
| 2016/0311993 A1 | 10/2016 | Zhang et al. |

FOREIGN PATENT DOCUMENTS

| DE | 3906724 A1 | 3/1998 |
| EP | 1457528 A1 | 9/2004 |
| JP | 2002339264 A | 11/2002 |
| WO | 2016016808 A1 | 2/2016 |

OTHER PUBLICATIONS

STIC Search Report dated Apr. 15, 2020.*

* cited by examiner

*Primary Examiner* — Eisa B Elhilo
(74) *Attorney, Agent, or Firm* — Huntsman International LLC; Robert Diaz

(57) ABSTRACT

A process for the preparation of coloured and expanded thermoplastic polyurethane (coloured ETPU) material which comprises the following steps:
a) providing thermoplastic polyurethane (TPU) material and at least one gaseous fluid wherein the melting temperature of the TPU material is above the supercritical temperature of the at least one gaseous fluid
b) placing the TPU material in an autoclave together with a colorant and/or a fluorescent whitening agent (FWA), wherein the colorant is selected from at least one of a disperse dye, an acid dye and a pigment;
c) increasing the pressure in the autoclave by introducing the at least one gaseous fluid at a temperature below the melting point of the TPU material and at least above the supercritical temperature of the at least one gaseous fluid at the applied pressure (saturation step); and
d) allowing the non-expanded TPU material to saturate; and
e) decreasing the pressure in the autoclave down to ambient pressure at a temperature between the melting temperature and the glass transition temperature (Tg) of the TPU material at such a rate that the TPU material expands (expansion step) to obtain coloured ETPU material
f) removing the coloured ETPU material from the autoclave.

13 Claims, No Drawings

US 10,876,252 B2

PROCESS FOR DYEING AND FOAMING THERMOPLASTIC POLYURETHANE

CROSS-REFERENCE TO RELATED APPLICATIONS

This application is the National Phase of International Application PCT/EP2017/079157 filed Nov. 14, 2017 which designated the U.S. and which claims priority to U.S. application Ser. No. 16/199,031.2 filed Nov. 16, 2016. The noted applications are incorporated herein by reference.

The present invention relates to a process for the preparation of coloured and expanded thermoplastic polyurethane (coloured ETPU) material which comprises dyeing and foaming of thermoplastic polyurethane (TPU) material in supercritical fluids (such as supercritical carbon dioxide) in the presence of a colorant and/or a fluorescent whitening agent (FWA).

BACKGROUND OF THE INVENTION

Due to the outstanding properties with respect to mechanical stability and elasticity, polyurethane materials are frequently used in the manufacture of sporting goods. Since thermoplastic polyurethane (TPU) is very abrasion-resistive and tear resistant and, moreover, provides good cushioning properties, this material is particularly suitable for the production of soles for sport shoes.

Especially expanded (foamed) thermoplastic polyurethane (ETPU) and ETPU beads are proper for this purpose because of the excellent rebound properties, the lightweight and the comfort imparted by this material.

For decorative purposes as well as for safety reasons, it is desirable to have coloured ETPU in the production of sport shoes and other sporting goods.

Pigments have turned out to be the only colorants which are suitable for colouring of TPU in the conventional mass-dyeing process. The application of pigments, however, permits only a limited range of colours and provides dyed products having low rub-fastness which cause a certain staining of the mould in subsequent shaping processes.

Accordingly, there is a demand for an easily workable process for the coloration or optical brightening of TPU, preferably in form of TPU pellets, in a wide range of colour shades.

Goal of the Invention

It is a goal of the invention to develop an improved process for fabricating coloured and expanded thermoplastic polyurethane (ETPU), starting from non-expanded thermoplastic polyurethane (TPU) whereby said process has improved processing time, improved colouring (in depth) and uses environmentally friendly foaming gasses.

It is a further goal to develop an improved process for fabricating coloured and expanded thermoplastic polyurethanes suitable for use in vibration and shock absorptive materials such as the use in highly demanding footwear.

It has now been found that these objectives are met by application of disperse dyes, acid dyes or fluorescent whitening agents (FWA) in supercritical carbon dioxide in combination with a foaming process using supercritical fluids such as supercritical carbon dioxide (SC $CO_2$).

Definitions

In the context of the present invention the following terms have the following meaning:

1) The term "pellet", as used herein, refers to a non-expanded piece of material (e.g. spherical, ellipsoidal, polyhedral or cylindrical) having an average diameter in the range 0.2 mm up to 10 mm, preferably in the range 0.5 up to 5 mm. The term "bead", as used herein, refers to an expanded or foamed pellet having dimensions being 1.2 up to 100 times the size of the original pellet.
2) The term "sheet", as used herein, refers to a non-expanded piece of material, with one dimension significantly smaller than the other two, typically but not exclusively a rectangular cuboid (a further example could be a thin pre-shaped part like a shoe sole, or a thin polymer coating layer on a non expandable part) and wherein the smallest dimension falls in the range between 0.2 mm and to 100 mm. The term "expanded sheet", as used herein, refers to an expanded or foamed sheet having dimensions being 1.2 up to 100 times the size of the original sheet.
3) "Gaseous fluid" refers to the blowing agent or blowing agent mixture (e.g. $CO_2$) and a possible co-absorbed gas (e.g. $N_2$, present for its possible effect on material properties, nucleation rate, . . . ) in either gas or supercritical gas state of matter, depending on pressure and temperature conditions.
4) "Saturation" refers to the state where required amount of colouring agent or gaseous fluid (acting as blowing agent) has been dissolved into the thermoplastic polyurethane material (e.g. pellet) with only small internal concentration gradients remaining. The required dissolved amount largely depends on the final required colour/density.
5) The term "polyurethane", as used herein, is not limited to those polymers which include only urethane or polyurethane linkages. It is well understood by those of ordinary skill in the art of preparing polyurethanes that the polyurethane polymers may also include allophanate, carbodiimide, uretidinedione, and other linkages in addition to urethane linkages.
6) The term "thermoplastic" as used herein refers in its broad sense to designate a material that is reprocessable at an elevated temperature, whereas "thermoset" designates a material that exhibits high temperature stability without such reprocessability at elevated temperatures.
7) The expression "supercritical" and more in particular "supercritical carbon dioxide" will be understood as meaning $CO_2$ whose pressure and temperature are above the critical pressure and temperature. Supercritical carbon dioxide has approximately the viscosity of the corresponding gas and a density which is approximately comparable to the density of the liquefied gas.

DETAILED DESCRIPTION

The present invention accordingly relates to a process for the preparation of coloured and expanded thermoplastic polyurethane (coloured ETPU) material which comprises the following steps:

a) providing thermoplastic polyurethane (TPU) material and at least one gaseous fluid wherein the melting temperature of the TPU material is above the supercritical temperature of the at least one gaseous fluid;
b) placing the TPU material in an autoclave together with a colorant and/or a fluorescent whitening agent (FWA), wherein the colorant is selected from at least one of a disperse dye, an acid dye and a pigment;

c) increasing the pressure in the autoclave by introducing the at least one gaseous fluid at a temperature below the melting point of the TPU material and at least above the supercritical temperature of the at least one gaseous fluid at the applied pressure (saturation step); and d) allowing the non-expanded TPU material to saturate; and e) decreasing the pressure in the autoclave down to ambient pressure at a temperature between the melting temperature and the glass transition temperature (Tg) of the TPU material at such a rate that the TPU material expands (expansion step) to obtain coloured ETPU material f) removing the coloured ETPU material from the autoclave The saturation step includes both saturation of the TPU material with the colorant as well as saturation with the blowing agent (being the gaseous fluid). During the saturation step the TPU material uptakes the gaseous fluid (e.g. $CO_2$) and the colorant (dye). The saturation step is hence also to be regarded as a colouring step.

According to embodiments of the invention, the at least one gaseous fluid comprises $CO_2$.

According to embodiments of the invention, the at least one gaseous fluid is selected from $CO_2$ and the saturation step is performed at a pressure in the range of 73-500 bar and at a temperature below the melting point of the TPU material and at least above the supercritical temperature of supercritical $CO_2$ (SC $CO_2$) at the applied pressure.

According to embodiments of the invention, the saturation step is performed at pressures in the range 100 up to 300 bar, preferably in the range 125 up to 250 bar.

According to embodiments of the invention, the saturation step is performed at a temperature in the range 70 up to 170° C.

According to embodiments of the invention, the gaseous fluids may include but are not limited to $N_2$ and/or $CO_2$. Depending on the final application of the ETPU material it may be desirable to include gasses having good thermal insulation properties such as Hydro Chloro Fluoro Carbons (HCFC's), Chloro Fluoro Carbons (CFC's) Hydro Chloro Fluoro Olefins (HCFO's), Hydro Fluoro Olefins (HFO's), (cyclo)-alkanes such as (cyclo)-pentane and noble gases such as krypton, xenon and argon.

According to embodiments of the invention, the gaseous fluids in the autoclave may further comprise additives which are reactive (not limited to covalent bonding) towards the TPU material and which may result in modification of the TPU material during the charging step. Typically these additives would aim to modify bulk properties, including for example fire retardants, . . . .

According to the invention, the step of increasing the pressure in the autoclave (saturation step) is such that the pressure within the autoclave is preferably above the supercritical limits of the gaseous fluids (e.g. for $CO_2$ above 7.4 MPa, for nitrogen above 3.4 MPa).

According to the invention, the temperature within the autoclave is at least above the supercritical limits of the gaseous fluids (e.g. for $CO_2$ above 31° C.) and the temperature within the autoclave is below the melting temperature of the thermoplastic material, this gives operating temperatures in the range 31-200° C.

According to the invention the decrease in pressure during the expansion step is performed at a rate of at least 5 bar/sec.

According to the invention, the step of saturating the TPU material to reach a saturation state is performed at controlled pressure and temperature within the autoclave until the colorant saturated TPU material is achieved. This step typically can last from several minutes to several hours.

Thermoplastic Polyurethane (TPU) Materials

TPU and processes for their production are well known. By way of example, TPUs can be produced via reaction of
a) one or more polyfunctional isocyanates with
b) one or more compounds reactive towards isocyanates having a molecular weight in the range of from 500 to 500000, preferably from 1000 to 100000, and, if appropriate,
c) chain extenders having a molecular weight in the range of from 50 to 499, and if appropriate in the presence of
d) catalysts and/or conventional auxiliaries and/or conventional additives.

The one or more polyfunctional isocyanates used for forming the TPU may be well-known aliphatic, cycloaliphatic, araliphatic, and/or aromatic isocyanates, preferably diisocyanates. For example tri-, tetra-, penta-, hexa-, hepta- and/or octamethylene diisocyanate, 2-methylpentamethylene 1,5-diisocyanate, 2-ethylbutylene 1,4-diisocyanate, 1,5-pentamethylene diisocyanate, 1,4-butylene diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, and/or dicyclohexylmethane 4,4'-, 2,4'- and 2,2'-diisocyanate, 2,2'-, 2,4'- and/or 4,4'-diphenylmethane diisocyanate (MDI), naphthylene 1,5-diisocyanate (NDI), 2,4- and/or 2,6-tolylene diisocyanate (TDI), diphenylmethane diisocyanate, 3,3'-dimethylbiphenyl diisocyanate, 1,2-diphenylethane diisocyanate, and/or phenylene diisocyanate.

The one or more polyfunctional isocyanates used for forming the TPU may be pure 4,4'-diphenylmethane diisocyanate or mixtures of that diisocyanate with one or more other organic polyisocyanates, especially other diphenylmethane diisocyanates, for example the 2,4'-isomer optionally in conjunction with the 2,2'-isomer. The polyisocyanate component may also be an MDI variant derived from a polyisocyanate composition containing at least 95% by weight of 4,4'-diphenylmethane diisocyanate. MDI variants are well known in the art and, for use in accordance with the invention, particularly include liquid products obtained by introducing carbodiimide groups into said polyisocyanate composition and/or by reacting with one or more polyols.

Preferred polyfunctional isocyanates are those containing at least 80% by weight of 4,4'-diphenylmethane diisocyanate. More preferably, the 4,4'-diphenylmethane diisocyanate content is at least 90, and most preferably at least 95% by weight.

The one or more compounds reactive toward isocyanates used for forming TPU may have a molecular weight of between 500 and 500000 and may be selected from polyesteramides, polythioethers, polycarbonates, polyacetals, polyolefins, polysiloxanes and, especially, polyesters and polyethers or mixtures thereof.

The one or more compounds reactive toward isocyanates used for forming the TPU are preferably diols, such as polyether diols and may include products obtained by the polymerization of a cyclic oxide, for example ethylene oxide, propylene oxide, butylene oxide or tetrahydrofuran in the presence, where necessary, of difunctional initiators. Suitable initiator compounds contain 2 active hydrogen atoms and include water, butanediol, ethylene glycol, propylene glycol, diethylene glycol, triethylene glycol, dipropylene glycol, 1,3-propane diol, neopentyl glycol, 1,4-butanediol, 1,5-pentanediol, 2-methyl-1,3-propanediol, 1,6-pentanediol and the like. Mixtures of initiators and/or cyclic oxides may be used.

The one or more compounds reactive toward isocyanates used for forming TPU are preferably diols, such as polyester and may include hydroxyl-terminated reaction products of dihydric alcohols such as ethylene glycol, propylene glycol, diethylene glycol, 1,4-butanediol, neopentyl glycol, 2-methyl-1,3-propanediol, 1,6-hexanediol or cyclohexane dimethanol or mixtures of such dihydric alcohols, and dicarboxylic acids or their esterforming derivatives, for example succinic, glutaric and adipic acids or their dimethyl esters, sebacic acid, phthalic anhydride, tetrachlorophthalic anhydride or dimethyl terephthalate or mixtures thereof. Polycapro lactones and unsaturated polyesterpolyols should also be considered.

Suitable low molecular weight (generally below 400) difunctional compounds that serve as chain extenders used for forming the TPU may include diols, such as aliphatic diols like ethylene glycol, 1,3-propanediol, 2-methyl-1,3-propanediol, 1,4-butanediol, 1,5-pentanediol, 1,6-hexanediol, 1,8-octanediol, 1,9-nonanediol, 1,10-decanediol, 1,12-dodecanediol, 1,2-propanediol, 1,3-butanediol, 2,3-butanediol, 1,3-pentanediol, 2-ethyl-butanediol, 1,2-hexanediol, 1,2-octanediol, 1,2-decanediol, 3-methylpentane-1,5-diol, 2-methyl-2,4-pentanediol, 3-methyl-1,5-pentanediol, 2,5-dimethyl-2,5-hexanediol, 3-chloro-propanediol, 1,4-cyclohexanediol, 2-ethyl-2-butyl-1,3-propanediol, diethylene glycol, dipropylene glycol and tripropylene glycol, 1,4'-butylenediol, 3-hydroxy-2,2-dimethyl-propanoic acid, aminoalcohols such as ethanolamine, N-methyldiethanolamine and the like, diamines, hydrazines and hydrazides and mixtures thereof. Preferred are diols such as hexanediol, 1,4-butanediol or ethylene glycol. 1,4-Butanediol is most preferred. Di-esters of terephthalic acid with glycols having 2 to 4 carbon atoms, e.g. terephthalic acid bis(ethylene glycol) or bis-1,4-butanediol, and hydroxyalkylene ethers of hydroquinone, and polyoxytetramethylene glycols having molecular weights of from 162 to 378, are also suitable.

Other conventional ingredients (additives and/or auxiliaries) may be used for forming TPU. These include catalysts, surfactants, flame proofing agents, fillers, pigments (to provide different colors), stabilizers and the like. Catalysts which enhance the formation of urethane and urea bonds may be used, for example, tin compounds, such as a tin salt of a carboxylic acid, e.g. dibutyltin dilaurate, stannous acetate and stannous octoate; amines, e.g. dimethylcyclohexylamine and triethylene diamine.

The TPUs can be produced by the known processes continuously, for example using reactive extruders, or the belt process, by the one-shot method or the prepolymer method, or batchwise. The components a), b) and, if appropriate, c) and d) reacting in these processes can be mixed with one another in succession or simultaneously, whereupon the reaction immediately starts.

In the extruder process, structural components a), b) and, if appropriate, c) and d) are introduced individually or in the form of a mixture into the extruder, e.g. at temperatures of from 100 to 280° C., preferably from 140 to 250° C., and reacted, and the resultant TPU is extruded, cooled and pelletized. The pellets obtained by this method can be applied in the dyeing or whitening process according to the invention or can be further processed to ETPU beads.

In a preferred embodiment, TPU pellets are applied in the process according to the invention.

Dyeing of textile substrates in supercritical fluids, in particular in supercritical $CO_2$, has been known for a long time and is described, for example, in DE 3906724 A1.

It has now unexpectedly been found that TPU material, e.g. in the form of pellets, beads or other shapes can also be coloured or brightened by this method in combination with a method to expand the TPU material to form coloured ETPU.

In one embodiment of the invention, the colorant or fluorescent whitening agent is applied via the direct dyeing method, i.e. the TPU is placed in the autoclave together with the pure dye, pigment or FWA. In this embodiment, the colorant or FWA can be applied in any common form, as powder, granules, micro-granules or crude product.

In a further embodiment, the colorant or fluorescent whitening agent is applied via dye transfer from dyed polyester (PES), i.e. the TPU material, e.g. in the form of pellets, is placed in the autoclave together with PES material that has previously been treated with a colorant or FWA according to conventional methods, e.g. mass-dyeing process or exhaust dyeing process.

In this regard, the form of the PES material is not critical; for example fabric, yarn, granules and powder can be used.

The present invention requires, instead of the conventional aqueous or organic solutions, the use of supercritical carbon dioxide. As a consequence thereof, the process of this invention has a number of advantages. Because the supercritical $CO_2$ used in the process does not pass into the effluent, but is reused after the dyeing process, no contamination of the effluent occurs. Further, compared with aqueous systems, the mass transfer reactions necessary for dyeing the substrate, proceed substantially faster, so that in turn the substrate to be dyed can be penetrated particularly well and rapidly by the liquor. When dyeing pellets, the whole volume is uniformly penetrated and accordingly not only the surface but also the interior parts of the pellets are evenly coloured without significantly altering the properties of the material.

A further advantage of the inventive process is that it is possible to use disperse dyes, acid dyes, pigments or FWAs which consist exclusively of the actual agent and do not contain the customary dispersants and diluents. In addition, milling can be dispensed with in many cases.

There are several possibilities of purifying the supercritical $CO_2$ after the dyeing process. For example, the residual dye in the supercritical $CO_2$ can be adsorbed or absorbed over appropriate filters, like silica gel, kieselguhr, carbon, zeolith or alumina filters.

A further possibility is to remove the dyes remaining in the supercritical $CO_2$ by a temperature and/or pressure reduction and/or by an increase in volume. In this case the supercritical $CO_2$ is converted into the corresponding gas, which is then collected and, after reconversion into the supercritical state, used for dyeing further substrates. The dyes precipitate as liquid or solid dyes and are collected and reused for further dyeing.

The precondition for applicability in this process is a sufficient solubility of the respective agent in supercritical $CO_2$. Up to now, all disperse dyes, acid dyes, pigments and FWAs that have been tested do fulfil this condition.

Suitable Colorants (Disperse Dyes, Acid Dyes and Pigments) for Use in the Invention Suitable disperse dyes are, for example, the compounds of formulae (1)-(8)

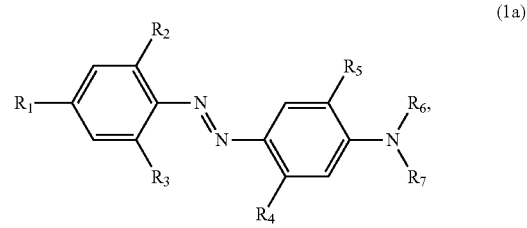

(1a)

wherein $R_1$ is bromine, chlorine, cyano, nitro, trifluoromethyl, $C_1$-$C_{12}$alkyl or $C_1$-$C_{12}$alkoxy, $R_2$ denotes hydrogen, $C_1$-$C_{12}$alkyl, $C_1$-$C_{12}$alkoxy, bromine, chlorine, cyano, nitro or trifluoromethyl, $R_3$ represents bromine, chlorine, cyano, nitro or trifluoromethyl, $R_4$ is hydrogen, $C_1$-$C_4$alkyl, halogen, $CF_3$ or —$NHCOR_{20}$ wherein $R_{20}$ is $C_1$-$C_4$alkyl, $R_5$ is hydrogen, halogen, $C_1$-$C_4$alkyl or $C_1$-$C_4$alkoxy;

$R_6$ and $R_7$ are each independently of the other hydrogen, $C_1$-$C_6$alkyl that is unsubstituted or substituted by hydroxy, cyano, acyloxy, N-phthalimidyl or by phenoxy, x being a number from 0 to 4 and it being possible for the alkyl chain, from $C_2$ upwards, optionally to be interrupted by one or more oxygen atoms, or are a radical of formula —$CH_2CH_2$—$COOR_{21}$, —$CH_2CH_2$—O—$COR_{21}$,

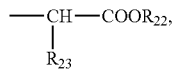

or of formula

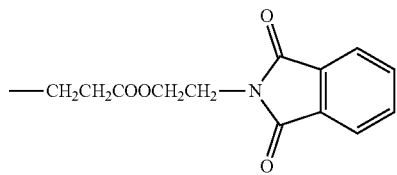

$R_{21}$ and $R_{22}$ each independently of the other being $C_1$-$C_4$alkyl and $R_{23}$ being hydrogen or $C_1$-$C_4$alkyl;

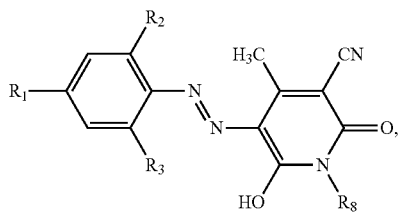
(1b)

wherein $R_1$ $R_2$ and $R_3$ are as defined above and $R_8$ denotes $C_1$-$C_{12}$alkyl or $C_1$-$C_{12}$alkoxyalkyl,

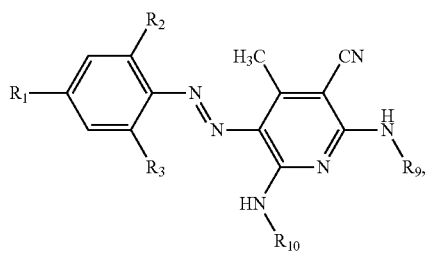
(1c)

wherein $R_1$ $R_2$ and $R_3$ are as defined above and $R_9$ and $R_{10}$ are each independently of the other hydrogen, $C_1$-$C_{12}$alkyl which is unsubstituted or substituted by cyano, carboxy, hydroxy, $C_1$-$C_6$alkoxy or $C_2$-$C_8$alkoxyalkoxy, or are $C_6$-$C_{24}$aryl which is unsubstituted or substituted by cyano, carboxy, hydroxy, $C_1$-$C_6$alkoxy or $C_2$-$C_8$alkoxyalkoxy, or are $C_7$-$C_{25}$aralkyl which is unsubstituted or substituted by cyano, carboxy, hydroxy, $C_1$-$C_6$alkoxy or $C_2$-$C_8$alkoxyalkoxy;

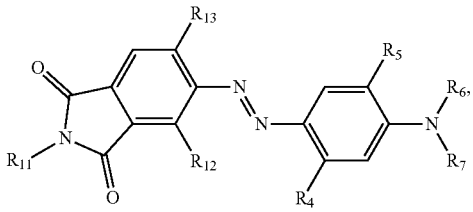
(1d)

wherein $R_4$, $R_5$, $R_6$ and $R_7$ are as defined above, $R_{11}$ is $C_1$-$C_{12}$alkyl, $R_{12}$ denotes hydrogen, chlorine, bromine, nitro or cyano, and $R_{13}$ represents chlorine, bromine or cyano;

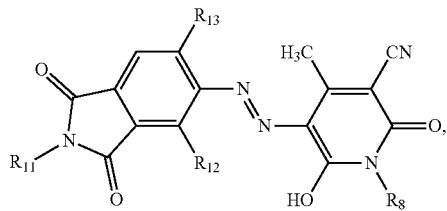
(1e)

wherein $R_8$, $R_{11}$, $R_{12}$ and $R_{13}$ are as defined above;

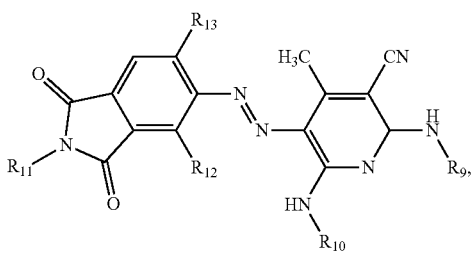
(1f)

wherein $R_9$, $R_{10}$, $R_{11}$, $R_{12}$ and $R_{13}$ are as defined above;

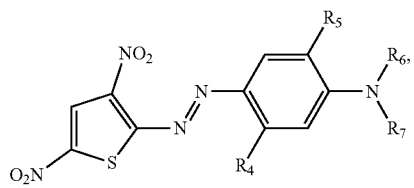
(1g)

wherein $R_4$, $R_5$, $R_6$ and $R_7$ are as defined above;

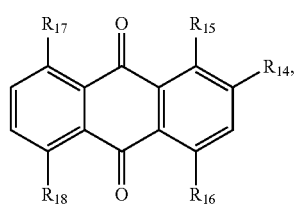
(1h)

wherein $R_{14}$ is hydrogen, $C_1$-$C_6$alkoxy, $C_6$-$C_{24}$aryloxy or —$SO_2$—NH—$R_{24}$, with $R_{24}$ being $C_1$-$C_{12}$alkyl which is unsubstituted or substituted by cyano, carboxy, hydroxyl or $C_1$-$C_6$alkoxy, $R_{15}$ and $R_{16}$ are each independently of the other amino, hydroxyl, nitro, phenylamino, 4-(2-hydroxyethyl)phenylamino, benzoylamino, o-chlorobenzoyl amino, m-chlorobenzoylamino, p-chlorobenzoyl amino, phenyl aminosulfonyl, phenylsulfonylamino, p-tolyl sulfonyl amino or phenylmercapto, $R_{17}$ and $R_{18}$ are each independently of the other hydrogen, amino, hydroxyl or nitro;
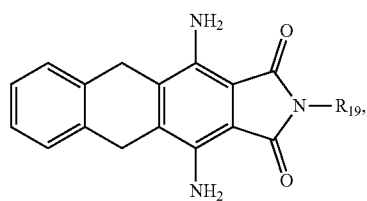 (1i)
wherein $R_{19}$ represents $C_2$-$C_{12}$alkoxyalkyl or $C_3$-$C_{15}$alkoxyalkoxyalkyl;
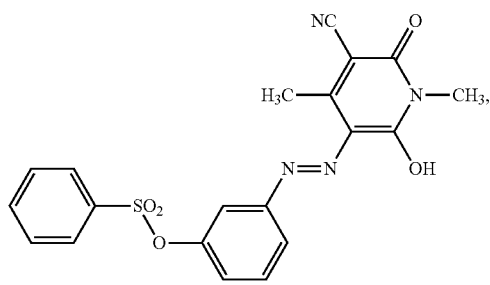 (1j)
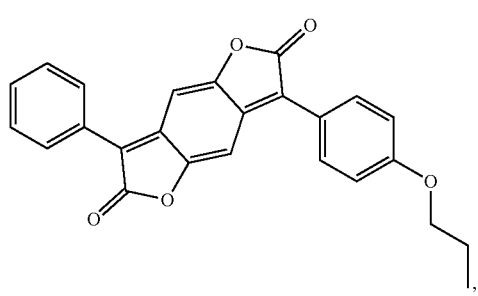 (1k)
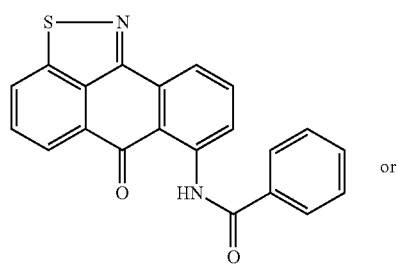 (1l)
or
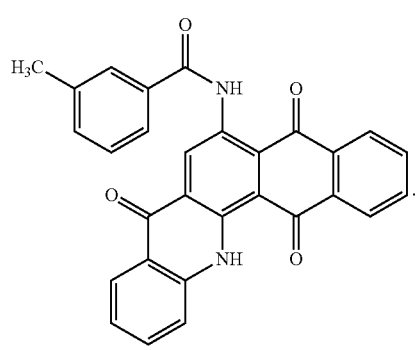 (1m)
Examples for preferred disperse dyes are the following compounds:
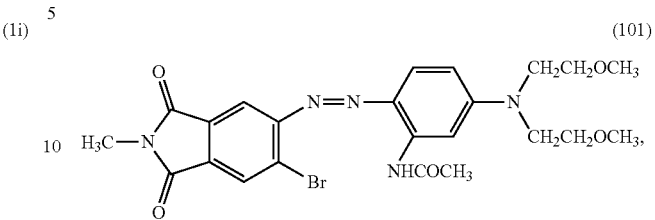 (101)
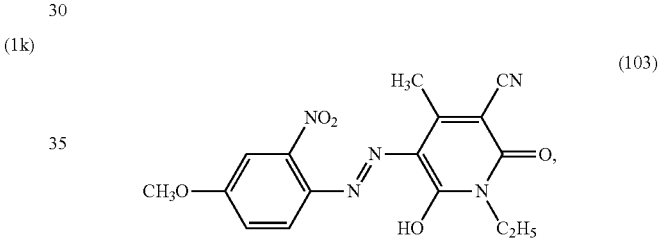 (102)
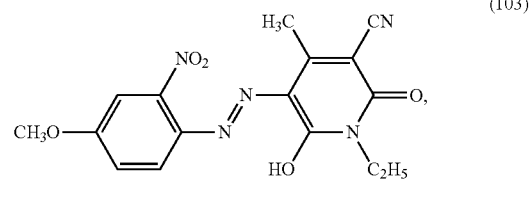 (103)
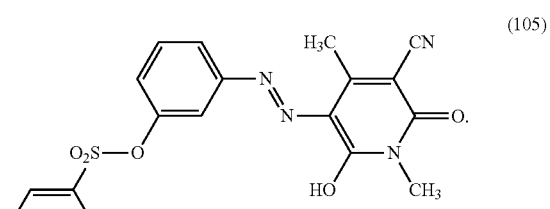 (104)
(105)
Suitable FWAs are, for example, the compounds of formulae (2a)-(2c) . . .

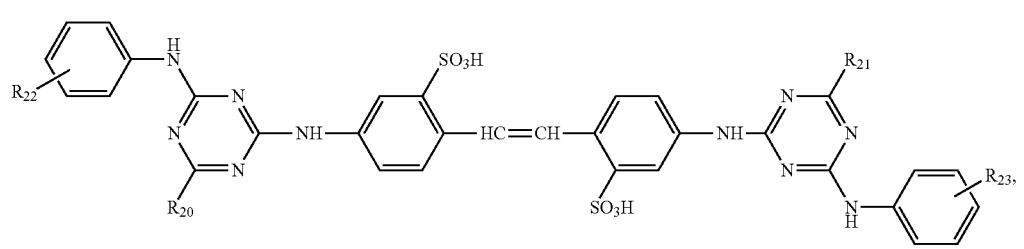

(2a)

wherein $R_{20}$ and $R_{21}$ are each independently of the other $C_1-C_{12}$alkoxy, bis($C_1-C_{12}$hydroxyalkyl)amino, $C_1-C_{12}$hydroxyalkoxy or N-morpholino, $R_{22}$ and $R_{23}$ each independently of the other represent hydrogen, sulfo or 2-hydroxyethyl sulfonyl;

(2b)

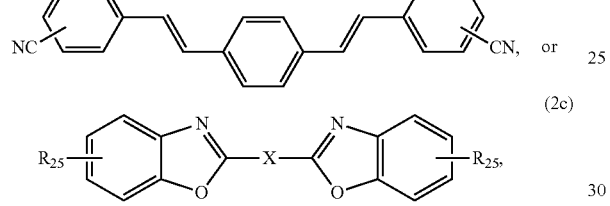

or (2c)

wherein $R_{25}$ denotes hydrogen, $C_1-C_6$alkyl, $C_6-C_{14}$aryl or $C_7-C_{24}$aralkyl and X is a bivalent radical of formula (2c1), (2c2) or (2c3)

(2c1)

(2c2)

(2c3)

Examples for preferred FWAs are the following compounds:

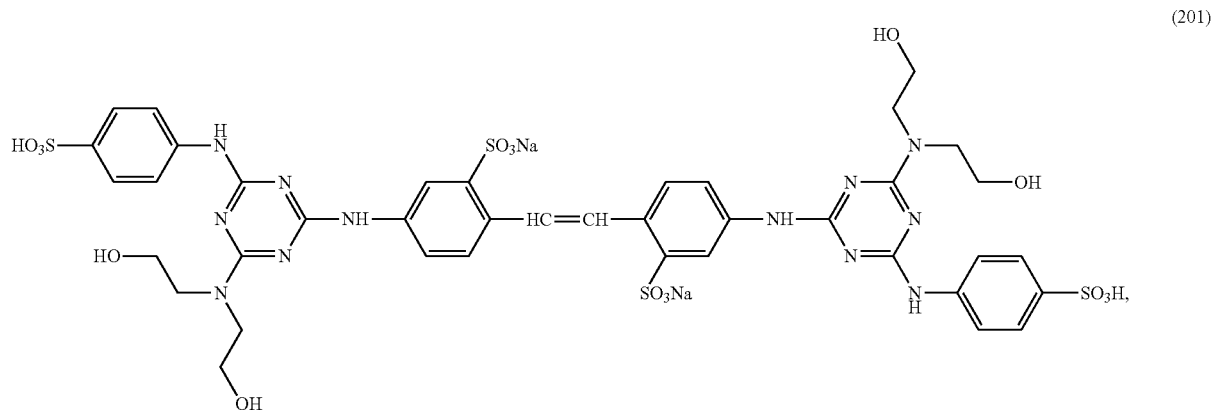

(201)

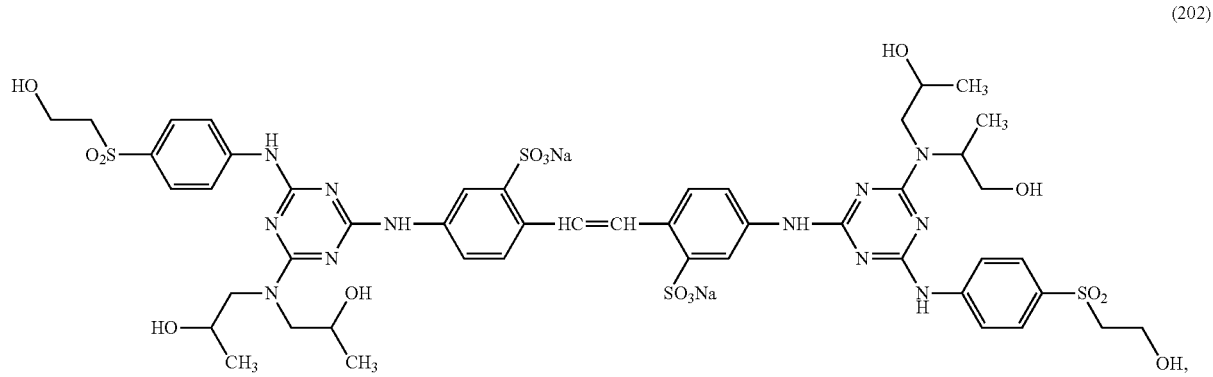

(202)

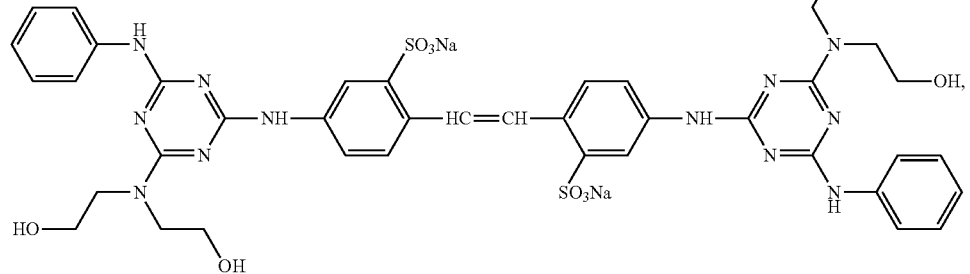
(203)
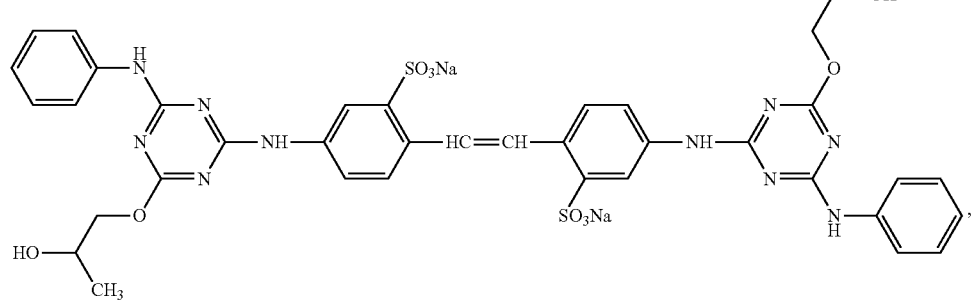
(204)
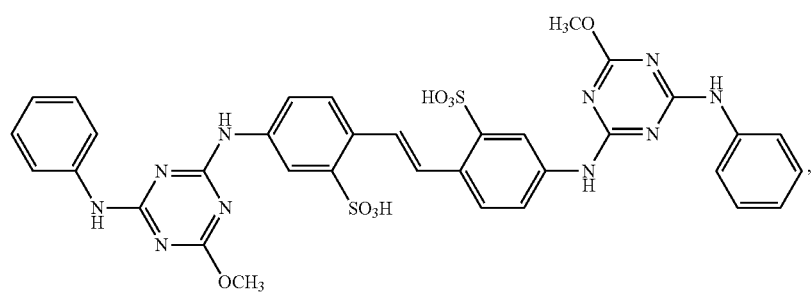
(205)
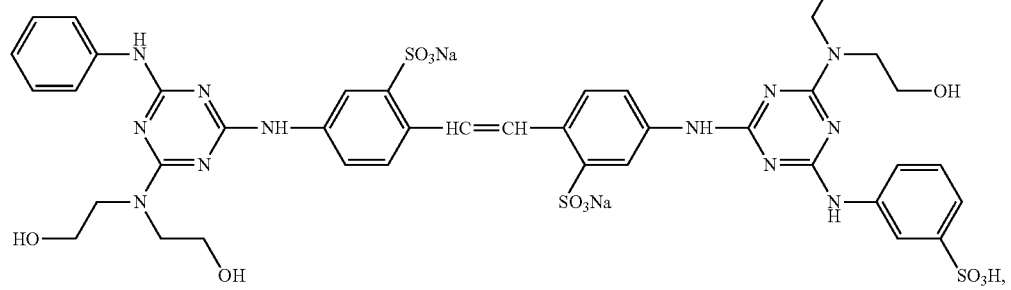
(206)

-continued

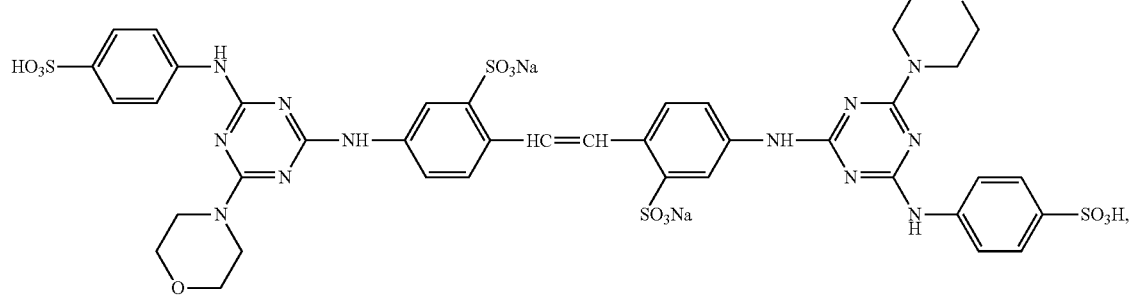
(207)

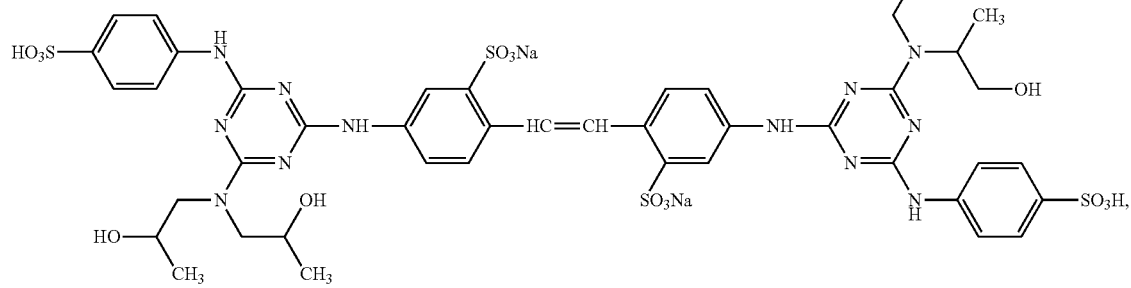
(208)

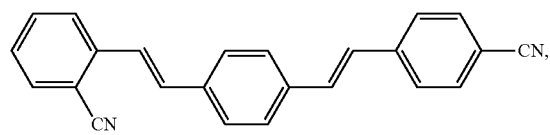
(209)

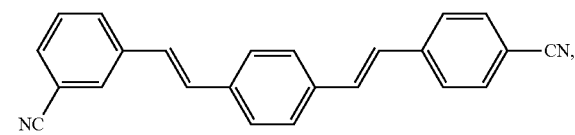
(210)

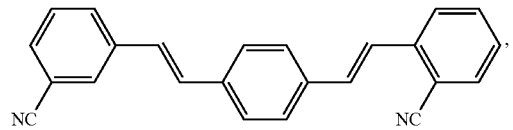
(211)

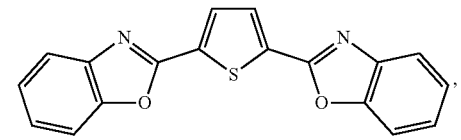
(212)

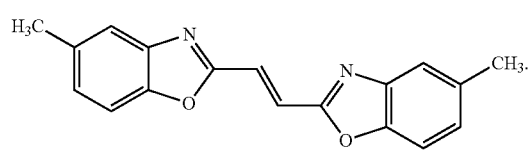
(213)

The invention has a further advantage that it is possible to dye textiles the same way as the ETPU material achieving a very good colour match between the textiles and the ETPU.

The coloured and expanded (foamed) polyurethane (ETPU) materials obtained by the process according to the invention can be used in various products.

The preferred application of the coloured and expanded (foamed) polyurethane (ETPU) materials is the manufacture of sporting goods, in particular soles for sports shoes.

The Examples that follow serve to illustrate the invention. Parts therein are parts by weight and percentages are percentages by weight, unless otherwise indicated. The TPU pellets used are IROGRAN® A 87 P 6001 from Huntsman.

Example 1: Colouring and Expansion of Thermoplastic Polyurethane Pellets According to the Invention An experiment was set up to illustrate the process of colouring and expansion of TPU pellets according to the invention.

The autoclave was filled with 300 g TPU pellets and 1.2 g dye (Terasil® Royal Blue SC). The autoclave was heated up to a temperature required for dyeing and $CO_2$ circulation is started. The pressure is then further increased to the 250 bar to achieve the required $CO_2$ density for dyeing and the temperature is adjusted to 120° C. The pellets were then dyed for 2 hours. In a next step the process conditions were changed to conditions required for foaming. This involved a reduction of the pressure to 145 bar and an increase of the temperature to 140° C. When foaming conditions were reached, the pressure was released as fast as possible and the autoclave was opened. The obtained coloured and expanded (foamed) TPU beads were uniformly coloured and the ETPU beads have volume sizes being up to 10 times the size of the original TPU pellet.

Example 2: Colouring and Expansion of Thermoplastic Polyurethane Pellets According to the Invention An experiment was set up to illustrate the process of colouring and expansion of TPU pellets according to the invention.

The autoclave was filled with 300 g TPU pellets and 1.2 g dye (Terasil® Royal Blue SC). The autoclave was heated up to a temperature required for dyeing and $CO_2$ circulation is started. The pressure is then further increased to the 250 bar to achieve the required $CO_2$ density for dyeing and the temperature is adjusted to 120° C. The pellets were then dyed for 2 hours. In a next step the process conditions were changed to conditions required for foaming. This involved a reduction of the pressure to 145 bar and an increase of the temperature to 145° C. (in stead of 140° C. in example 1). When foaming conditions were reached, the pressure was released as fast as possible and the autoclave was opened. The obtained coloured and expanded (foamed) TPU beads were uniformly coloured and the ETPU beads have volume sizes being up to 10 times the (volume) size of the original TPU pellet.

Comparative Example 3: Colouring and Expansion of Thermoplastic Polyurethane Pellets The autoclave was filled with 300 g TPU pellets and 1.2 g dye (Terasil® Royal Blue SC). The autoclave was heated up to a temperature required for dyeing and $CO_2$ circulation is started. The pressure is then further increased to the 250 bar to achieve the required $CO_2$ density for dyeing and the temperature is adjusted to 70° C. The pellets were then dyed for 2 hours. The process conditions were not changed in the expansion step. The expansion step hence involved a pressure of 250 bar (in stead of 145 bar in example 1) and a temperature of 70° C. (in stead of 140° C. in example 1). The pressure was then released as fast as possible and the autoclave was opened. The obtained TPU material was coloured but not expanded (not foamed).

Comparative Example 4: Colouring and Expansion of Thermoplastic Polyurethane Pellets The autoclave was filled with 300 g TPU pellets and 1.2 g dye (Terasil® Royal Blue SC). The autoclave was heated up to a temperature required for dyeing and $CO_2$ circulation is started. The pressure is then further increased to the 120 bar to achieve the required $CO_2$ density for dyeing and the temperature is adjusted to 70° C. The pellets were then dyed for 2 hours. The process conditions were not changed in the expansion step. The expansion step hence involved a pressure of 120 bar (in stead of 145 bar in example 1) and a temperature of 70° C. (in stead of 140° C. in example 1). The pressure was then released as fast as possible and the autoclave was opened. The obtained TPU material was coloured but not expanded (not foamed).

What is claimed is:

1. A process for the preparation of coloured and expanded thermoplastic polyurethane material which comprises the following steps:
   a) providing thermoplastic polyurethane material and at least one gaseous fluid wherein the melting temperature of the thermoplastic polyurethane material is above the supercritical temperature of the at least one gaseous fluid;
   b) placing the thermoplastic polyurethane material in an autoclave together with a colorant and/or a fluorescent whitening agent, wherein the colorant is selected from at least one of a disperse dye, an acid dye and a pigment;
   c) increasing the pressure in the autoclave by introducing the at least one gaseous fluid at a temperature below the melting point of the thermoplastic polyurethane material and at least above the supercritical temperature of the at least one gaseous fluid at the applied pressure;
   d) allowing the non-expanded thermoplastic polyurethane material to saturate; and
   e) decreasing the pressure in the autoclave down to ambient pressure at a temperature between the melting temperature and the glass transition temperature of the thermoplastic polyurethane material at such a rate that the thermoplastic polyurethane material expands to obtain the coloured expanded thermoplastic polyurethane material; and
   f) removing the coloured expanded thermoplastic polyurethane material from the autoclave;
   wherein the at least one gaseous fluid is selected from $CO_2$ and the saturation step is performed at a pressure in the range of 73-500 bar and at a temperature below the melting point of the thermoplastic polyurethane material and at least above the supercritical temperature of supercritical $CO_2$ (SC $CO_2$) at the applied pressure.

2. The process according to claim 1, wherein step (c) is performed at pressures ranging from 100 up to 300 bar.

3. The process according to claim 1, wherein step (c) is performed at a temperature ranging from 70 up to 170° C.

4. The process according to claim 1, wherein step (c) and step (e) are performed at a temperature between the melting temperature and the glass transition temperature of the thermoplastic polyurethane material.

5. The process according to claim 1, wherein the decrease in pressure during step (e) is performed at a rate of at least 5 bar/sec.

6. The process according to claim 1, wherein the coloured expanded thermoplastic polyurethane material has volume dimensions being 1.2 to 100 times the volume of the original unexpanded thermoplastic polyurethane material.

7. The process according to claim 1, wherein the colorant or fluorescent whitening agent dye is applied via dye transfer from dyed polyester.

8. The process according to claim 1, wherein the disperse dye of formulae (1a)-(8) is applied:

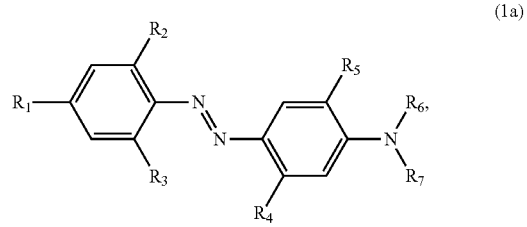

(1a)

wherein $R_1$ is bromine, chlorine, cyano, nitro, trifluoromethyl, $C_1$-$C_{12}$alkyl or $C_1$-$C_{12}$alkoxy, $R_2$ denotes hydrogen, $C_1$-$C_{12}$alkyl, $C_1$-$C_{12}$alkoxy, bromine, chlorine, cyano, nitro or trifluoromethyl, $R_3$ represents bromine, chlorine, cyano, nitro or trifluoromethyl, $R_4$ is hydrogen, $C_1$-$C_4$alkyl, halogen, $CF_3$ or —NHCOR$_{20}$ wherein $R_{20}$ is $C_1$-$C_4$alkyl, $R_5$ is hydrogen, halogen, $C_1$-$C_4$alkyl or $C_1$-$C_4$alkoxy;

$R_6$ and $R_7$ are each independently of the other hydrogen, $C_1$-$C_6$alkyl that is unsubstituted or substituted by hydroxy, cyano, acyloxy,

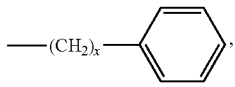

N-phthalimidyl or by phenoxy, x being a number from 0 to 4 and it being possible for the alkyl chain, from $C_2$ upwards, optionally to be interrupted by one or more oxygen atoms, or are a radical of formula —CH$_2$CH$_2$—COOR$_{21}$, —CH$_2$CH$_2$—O—COR$_{21}$,

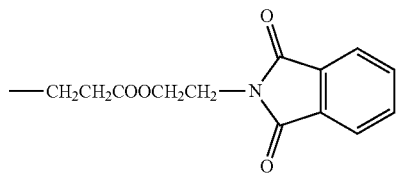

or of formula

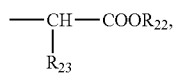

$R_{21}$ and $R_{22}$ each independently of the other being $C_1$-$C_4$alkyl and $R_{23}$ being hydrogen or $C_1$-$C_4$alkyl;

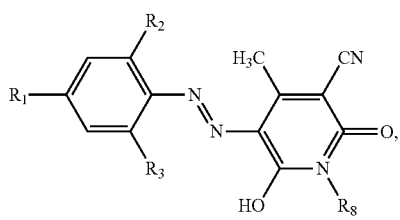

wherein $R_1$ $R_2$ and $R_3$ are as defined above and $R_8$ denotes $C_1$-$C_{12}$alkyl or $C_1$-$C_{12}$alkoxyalkyl,

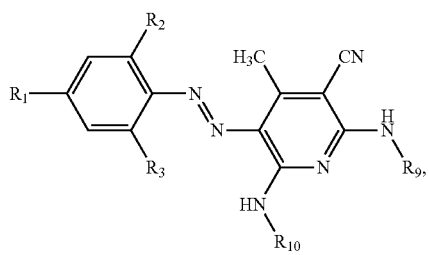

wherein $R_1$ $R_2$ and $R_3$ are as defined above and $R_9$ and $R_{10}$ are each independently of the other hydrogen, $C_1$-$C_{12}$alkyl which is unsubstituted or substituted by cyano, carboxy, hydroxy, $C_1$-$C_6$alkoxy or $C_2$-$C_8$alkoxyalkoxy, or are $C_6$-$C_{24}$aryl which is unsubstituted or substituted by cyano, carboxy, hydroxy, $C_1$-$C_6$alkoxy or $C_2$-$C_8$alkoxyalkoxy, or are $C_7$-$C_{25}$aralkyl which is unsubstituted or substituted by cyano, carboxy, hydroxy, $C_1$-$C_6$alkoxy or $C_2$-$C_8$alkoxyalkoxy;

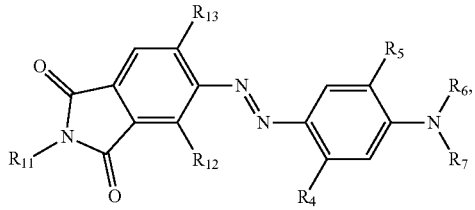

wherein $R_4$, $R_5$, $R_6$ and $R_7$ are as defined above, $R_{11}$ is $C_1$-$C_{12}$alkyl, $R_{12}$ denotes hydrogen, chlorine, bromine, nitro or cyano, and $R_{13}$ represents chlorine, bromine or cyano;

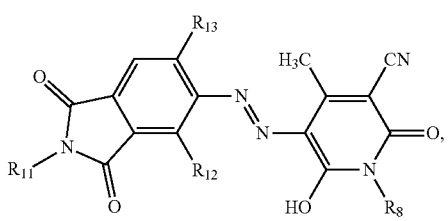

wherein $R_8$, $R_{11}$, $R_{12}$ and $R_{13}$ are as defined above;

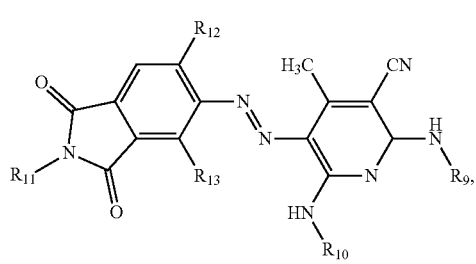

wherein $R_9$, $R_{10}$, $R_{11}$, $R_{12}$ and $R_{13}$ are as defined above;

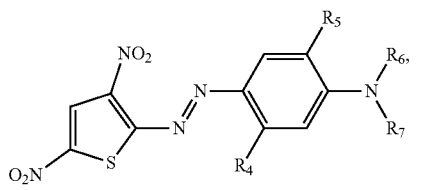

wherein $R_4$, $R_5$, $R_6$ and $R_7$ are as defined above;

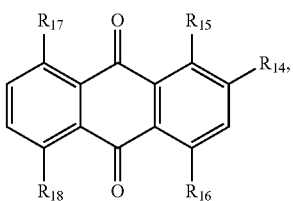

wherein $R_{14}$ is hydrogen, $C_1$-$C_6$alkoxy, $C_6$-$C_{24}$aryloxy or —SO$_2$—NH—R$_{24}$, with $R_{24}$ being $C_1$-$C_{12}$alkyl which is unsubstituted or substituted by cyano, carboxy, hydroxyl or $C_1$-$C_6$alkoxy, $R_{15}$ and $R_{16}$ are each independently of the other amino, hydroxyl, nitro, phenylamino, 4-(2-hydroxyethyl)phenylamino, benzoylamino, o-chlorobenzoylamino, m-chlorobenzoylamino, p-chlorobenzoylamino, phenylaminosulfonyl, phenylsulfonylamino, p-tolylsulfonylamino or phenylmercapto, $R_{17}$ and $R_{18}$ are each independently of the other hydrogen, amino, hydroxyl or nitro;

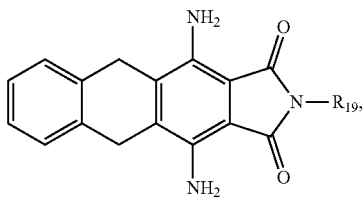
(1i)

wherein $R_{19}$ represents $C_2$-$C_{12}$alkoxyalkyl or $C_3$-$C_{15}$alkoxyalkoxyalkyl;

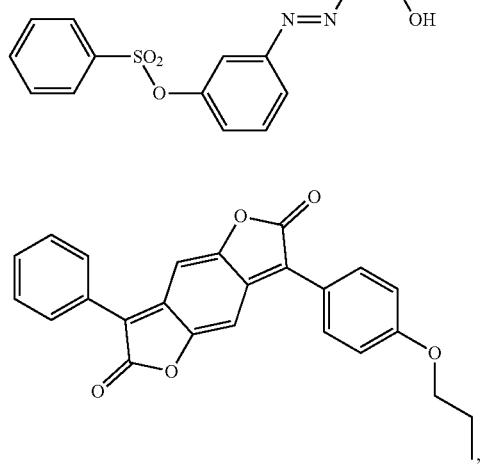
(1j)

(1k)

(1l)

or

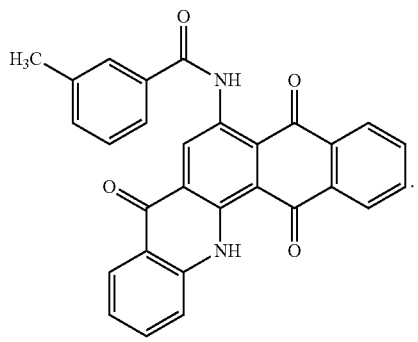
(1m)

9. The process according to claim 1, wherein the flouorescent whitening agent of formulae (2a)-(2c) is applied:

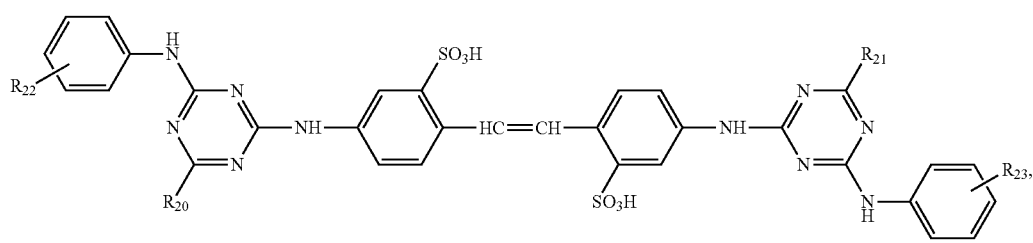
(2a)

wherein $R_{20}$ and $R_{21}$ are each independently of the other $C_1$-$C_{12}$alkoxy, bis($C_1$-$C_{12}$hydroxyalkyl)amino, $C_1$-$C_{12}$hydroxyalkoxy or N-morpholino, $R_{22}$ and $R_{23}$ each independently of the other represent hydrogen, sulfo or 2-hydroxyethylsulfonyl;

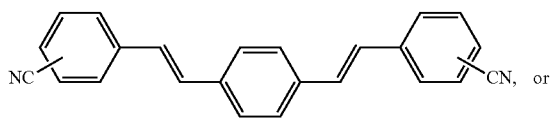
(2b)

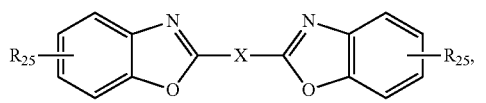
(2c)

wherein $R_{25}$ denotes hydrogen, $C_1$-$C_6$alkyl, $C_6$-$C_{14}$aryl or $C_7$-$C_{24}$aralkyl and X is a bivalent radical of formula (2c1), (2c2) or (2c3)

(2c1)

(2c2)

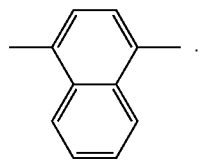 (2c3)

10. The process according to claim 1, wherein the thermoplastic polyurethane material is in the form of a pellets having an average diameter in the range of 0.2 to 10 mm.

11. A sporting good comprising the coloured expanded thermoplastic polyurethane of claim 1.

12. The sporting good according to claim 11, wherein the sporting good is a sport shoe.

13. The process according to claim 1, wherein step (c) is performed at pressures ranging from 100 up to 300 bar.

* * * * *